United States Patent [19]

Minemoto et al.

[11] Patent Number: 4,892,312

[45] Date of Patent: Jan. 9, 1990

[54] OPERATING DEVICE FOR TV GAME MACHINE

[75] Inventors: Hideki Minemoto; Hisayuki Yamaguchi, both of Tokyo, Japan

[73] Assignee: Kabushiki Kaisha Taito, Tokyo, Japan

[21] Appl. No.: 188,409

[22] PCT Filed: Sep. 19, 1986

[86] PCT No.: PCT/JP86/00487

§ 371 Date: Mar. 3, 1988

§ 102(e) Date: Mar. 3, 1988

[87] PCT Pub. No.: WO88/00489

PCT Pub. Date: Jan. 28, 1988

[30] Foreign Application Priority Data

Jul. 18, 1986 [JP] Japan .................... 61-111133

[51] Int. Cl.⁴ .............. A63B 17/04; G01D 5/34; H03M 1/26; F16H 13/00

[52] U.S. Cl. ............... 273/148 B; 273/DIG. 28; 273/85 G; 250/231 SE; 74/471 XY; 341/6

[58] Field of Search ........ 273/148 B, 85 G, DIG. 28; 250/231 SE; 74/471 XY, 436; 341/2; 200/38 F, 38 FA; 340/710

[56] References Cited

U.S. PATENT DOCUMENTS

| | | | |
|---|---|---|---|
| 3,940,136 | 2/1976 | Runte | 273/85 R |
| 4,326,128 | 4/1982 | Klein | 250/231 SE |
| 4,363,026 | 12/1982 | Salmon | 341/2 |
| 4,404,865 | 9/1983 | Kim | 74/471 XY |
| 4,552,360 | 11/1985 | Bromley et al. | 273/DIG. 28 |
| 4,575,086 | 3/1986 | Kim et al. | 273/148 B |
| 4,623,328 | 11/1986 | Hartranft | 250/231 SE |
| 4,712,088 | 12/1987 | Ernst | 341/2 |
| 4,716,290 | 12/1987 | Ogawa | 250/231 SE |
| 4,740,690 | 4/1988 | Mosier | 250/231 SE |

FOREIGN PATENT DOCUMENTS 3405688 8/1985 Fed. Rep. of Germany ... 273/148 B

*Primary Examiner*—Edward M. Coven
*Assistant Examiner*—Gary Jackson
*Attorney, Agent, or Firm*—Spencer & Frank

[57] ABSTRACT

An operating device for inputting the coordinate positions of a controlled object that moves across a screen. The present invention is directed to obviating the problems of the prior art involving the bad operability of a knob which requires rotation through a large angle to move the controlled object across the screen, and the short life-span of the knob due to frequent use. In order to overcome these problems, the rotational number of a main shaft is increased by a rotational number increasing mechanism and the rotational number of the output shaft of the rotational number increasing mechanism is optically or magnetically detected. The present invention is therefore suitable for use as an operating device for a TV game machine.

11 Claims, 6 Drawing Sheets

OPERATING DEVICE FOR TV GAME MACHINE

TECHNICAL FIELD

The present invention relates to an operating device for a TV game machine for inputting the coordinate positions of a controlled object moving on the face of the CRT screen of the TV game machine.

BACKGROUND OF THE INVENTION

TV game machines selectively use a coordinate value-input device, such as a joystick or ball controller, that is appropriate to the format of the games played thereon.

In certain games, such as block destroying games or tennis games, in which the coordinate positions of a controlled object such as a paddle or racket used to hit a moving object are moved right and left, it is well known to move the coordinate positions of the controlled object by turning a knob mounted on a variable resistor and thereby varying the resistance thereof.

Such an operating device of the type used in the above-described games has the following problem: the knob must be turned through a large angle so as to move the paddle right across the screen, which is a rather inconvenient operation.

Further, the operating device which employs the variable resistor has a very short life-span due to the frequency of operation of the knob and the excessive levels of force applied thereto by game players who become absorbed in the game.

Accordingly, an object of the present invention is to provide an operating device for a TV game machine which offers good operability and which does not become worn out by frequent rotation.

SUMMARY OF THE INVENTION

An operating device for a TV game machine according to the present invention is used for inputting the coordinate positions of a controlled object that moves over the face of the screen of the TV game machine. The device comprises a base assembly, a main shaft, an operating knob, a rotational number increasing mechanism, a disk, and a sensor section.

The base assembly is mounted on the control box of a game machine body. The main shaft is rotatably mounted on the base assembly. The operating knob is mounted on an end of the main shaft for rotation of the main shaft. The rotational number increasing mechanism is housed in the base assembly for increasing the rotational number of the main shaft. The disk is fixed to the output shaft of the rotational number increasing mechanism, and has a plurality of holes or notches on the periphery thereof.

The sensor section serves to detect the number of holes or notches in the disk. The sensor section may include two photosensors or magnetic sensors for distinguishing between two rotational directions of the disk.

In the present invention, the rotational number of the main shaft is increased by the rotational number increasing mechanism, and so the paddle can be moved right across the screen by rotation of the operating knob through a small angle. Further, the output shaft of the rotational number increasing mechanism is detected optically or magnetically. In consequence, the operating device can withstand hard use and hence enjoy a remarkable long life.

BRIEF DESCRIPTION OF THE DRAWINGS

FIG. 1 being a cross-sectional front view thereof, FIG. 2 being a bottom view and FIG. 3 being a side-elevational view.

DESCRIPTION OF THE PREFERRED EMBODIMENTS

Embodiments of the present invention will be hereinbelow described in detail with reference to the accompanying drawings.

Figure 1:
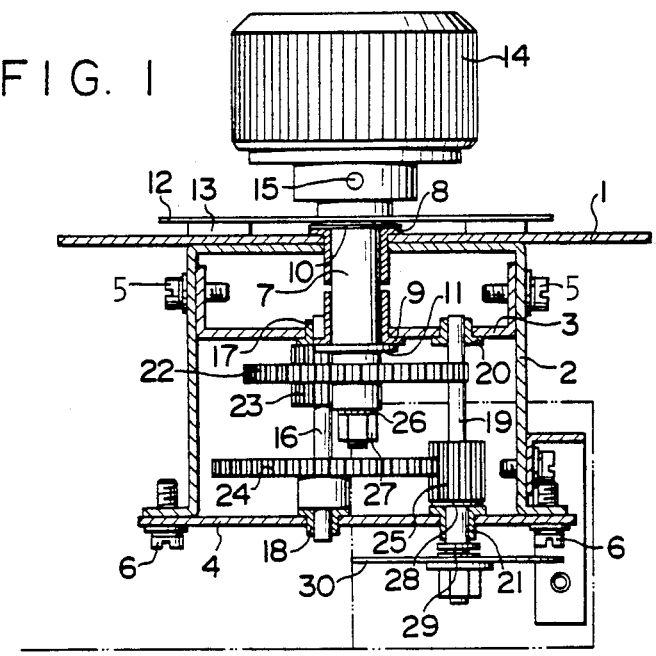
FIGS. 1 to 3 show an embodiment of an operating device for a TV game machine according to the present invention.
Figure 2:
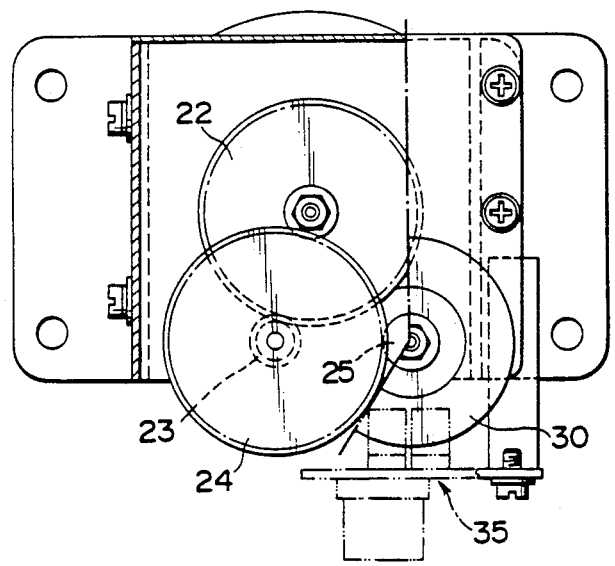
Figure 3:
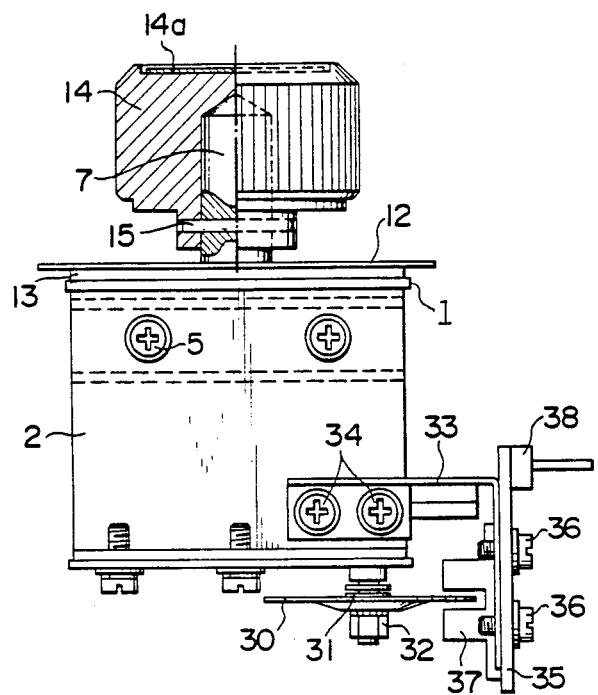

FIGS. 1 to 3 show an embodiment of an operating device for a TV game machine according to the present invention; FIG. 1 being a cross-sectional front view, FIG. 2 being a bottom view and FIG. 3 being a side-elevational view.

A base assembly for housing the operating device according to the present invention includes bases 1 to 4 as shown in FIG. 1. The base 1 is used to mount the operating device on a control box which is further mounted on each of the two sides of a table of the TV game machine. A shaft base 2 having a U-shaped cross-section is mounted on the base 1 by a spot welding or the like in such a manner as to form an integral unit. To the inner surfaces of the shaft base 2 is fixed an inner base 3 by screws 5, 5. A gear base 4 is fixed by screws 6, 6 to the bent portions formed at the ends of the legs of the shaft base 2.

A main input shaft 7 is rotatably mounted on the bases 1 to 3 through bushings 8 and 9. A washer 10 is inserted between the shoulder of the shaft 7 and the bushing 8 while an E-ring 11 is provided outside the bushing 9, so as to restrict the movement of the shaft 7 in the axial direction.

A mask 12 is attached on the top surface of the base 1 with a rubber disc 13 interposed between the mask 12 and the base 1.

A knob 14 is mounted on an end of the shaft 7 so as to rotate the shaft 7. The knob 14 has a large diameter which ensures that a game player grips it with his or her fingers and easily rotates it. The knob 14 is mounted on the shaft 7 by a pin 15. The upper surface of the knob 14 is provided with a decorative sheet 14a.

The inner base 3 and the gear base 4 constitute a gear box for housing a gear train constituting a rotational number increasing mechanism. Between the inner base 3 and the gear base 4 is disposed a second intermediate shaft 16 which is rotatably mounted thereon through bushings 17 and 18. A third, output shaft 19 is rotatably mounted on the inner base 3 and the gear base 4 through bushings 20 and 21. An E-ring 29 is fitted on the third shaft 19, and a pulse cam or disk 30 to be described later is mounted on an end of the third shaft 19.

A gear 22 is mounted on the shaft 7 by a nut 27 through a locking washer 26. The gear 22 meshes with a gear 23 mounted on the second shaft 16. A gear 24 is also mounted on the second shaft 16 and meshes with a gear 25 mounted on the third shaft 19 (See FIG. 2). The gears 22 to 25 constitute the rotational number increasing mechanism. In this embodiment, the gear ratio of the gear 22 to the gear 23 and the gear ratio of the gear 24 to the gear 25 are set to 72:16 respectively so as to ensure the rotational number of the third shaft 19 is about twenty times that of the shaft 7.

Figure 4A:
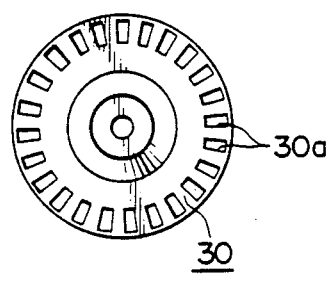
FIG. 4a is a view showing a pulse cam which is used in the operating device of this embodiment and which has holes.
Figure 4B:
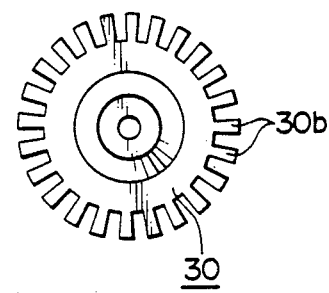
FIG. 4b is a view showing a pulse cam which is used in the operating device of this embodiment and which has notches.
Figure 5A:
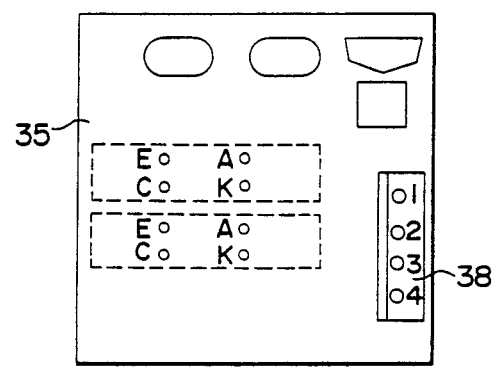
FIG. 5a is a plan view showing a photosensor used in the operating device of this embodiment and FIG. 5b is a bottom view showing the photosensor used in the operating device of this embodiment.
Figure 5B:
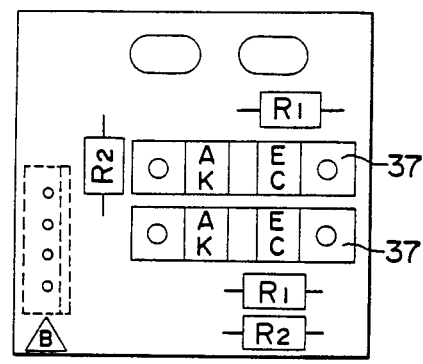

FIGS. 4a and 4b show pulse cams used in the the embodiments of the device of the present invention and FIGS. 5a and 5b a photosensor used in an embodiment of the device.

As shown in FIG. 3, the pulse or disk 30 is mounted on the end of the third shaft 19 by a nut 32 with a washer 31 disposed between the shaft 19 and the pulse cam 30. As shown in FIG. 4a, the pulse cam 30 has a large number of apertures in the form of holes 30a. In this embodiment, the pulse cam 30 has twenty-four holes 30a.

In place of the holes 30a, the pulse cam 30 may have apertures in the form of notches 30b, as shown in FIG. 4b, to fulfill a similar function.

A bracket 35 is fixed to the shaft base 2 by screws 34, 34 and a printed circuit board 35 is fixed to a bracket 33 by screws 36, 36.

As shown in FIGS. 5a and 5b, the printed circuit board 35 incorporates photosensors 37, 37, a pair of resistors $R_1$ and $R_2$ associated with each photosensor, a connector 38 and so on two blank spaces. The photosensor 37 is an active type photosensor composed of a light-emitting element and a light-receiving element. It optically detects the rotational number of the pulse cam 30 by the holes 30a of the pulse cam 30. A pair of photosensors 37 are used so as to distinguish between the two rotational directions.

The rotational number ratio of the rotational number increasing mechanism is set at the aforementioned value for the reasons described below. Due to the nature of the games, the knob 14 must be operable without necessitating a change in grip position by player. From the experience, it is known that the operation of the knob 14 is facilitated if the range of the rotational angle is approximately 150 degrees. Movement of a paddle constituting a controlled object across the entire screen requires about 200 pulses. This corresponds to about eight revolutions of the pulse cam 30, because the number of holes 30a in the pulse cam 30 is twenty four two blank spaces. This is accomplished by setting the gear ratio at the above-described value. An increase in the rotational number ratio of the rotational number increasing mechanism is performed in two steps to enable the size of the rotational number increasing mechanism to be reduced, so that the rotational number increasing mechanism is housed within the control box.

Figure 6:
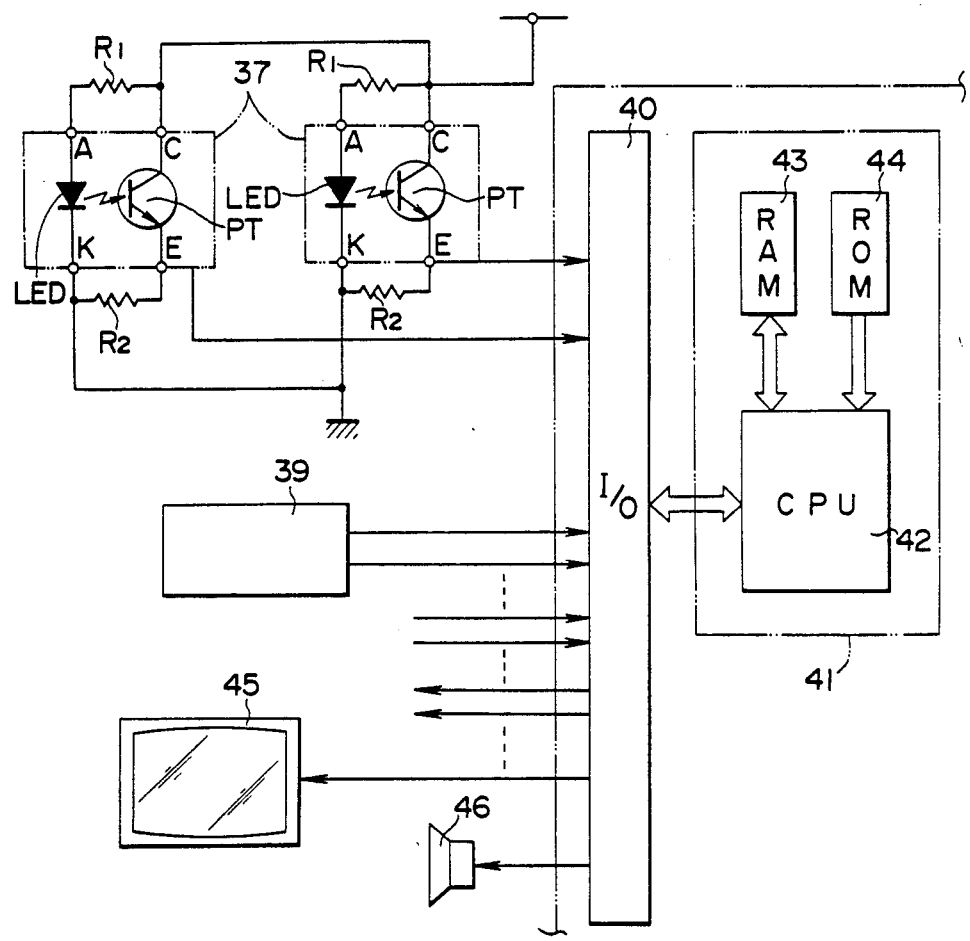
FIG. 6 is a circuit diagram showing mainly a detecting section of the operating device according to the present invention.

FIG. 6 is a circuit diagram showing mainly a detecting section of the operating device according to the present invention.

The photosensor 37 is composed of a light-emitting diode LED and a photo transistor PT. Other photosensors 39 are mounted on another operating device which is used when a table-type game machine is played by two players and which is disposed on the other side of the table. The outputs of the photosensors 37 and 39 are connected to a control circuit 41 of the table body through an I/O interface 40. The control circuit 41 is composed of a CPU 42, a RAM 43, and a ROM 44. The CPU 42 controls the game with the program stored in the ROM 44 on the basis of the signals from the photosensors 37 and 39 and/or other operation buttons while outputting picture signals to a CRT 45 and sound signals to a speaker 46.

Figure 7:
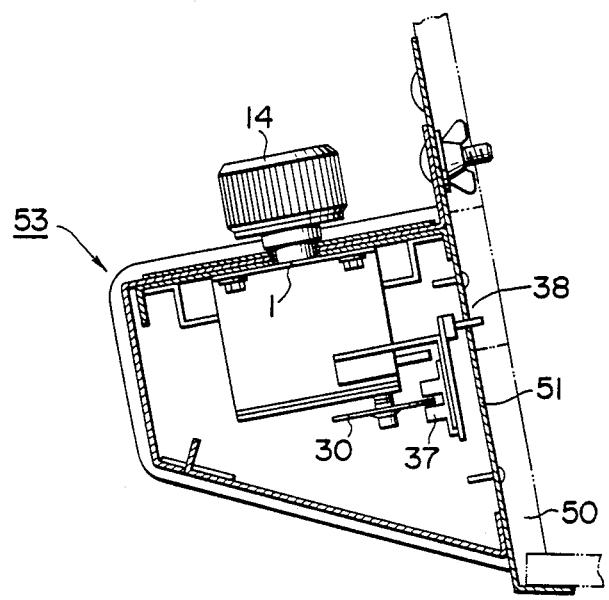
FIG. 7 is a side-elevational view showing the state wherein the operating device for the TV game machine is mounted on a control box.

FIG. 7 is a side-elevational view showing the state wherein the operating device for the TV game machine according to the present invention is mounted on the control box.

A control box 53 is mounted on a plate 51 which is fixed to the side of a table body 50 by screws. The upper surface of the control box 53 is provided with an opening to which the base 1 is fitted. Operation signals from the operating device are transmitted to the table body 50 through the connector 38.

Although the present invention has been described with reference to a preferred embodiment, it should be understood that the shapes and the values of any parts of this embodiment are only examples and thus the present invention is not restricted by them. Accordingly, the modifications described below are included within the scope of the present invention.

Figure 8A:
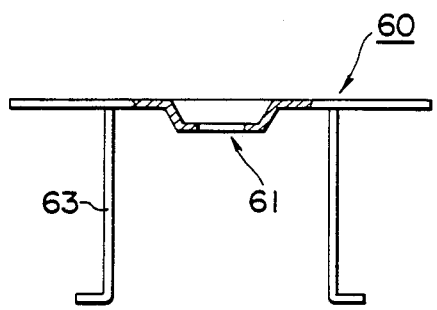
FIG. 8a is a side-elevational view of a modified example of a base assembly according to the present invention and FIG. 8b is a front view of the modified example of the base assembly according to the present invention.
Figure 8B:
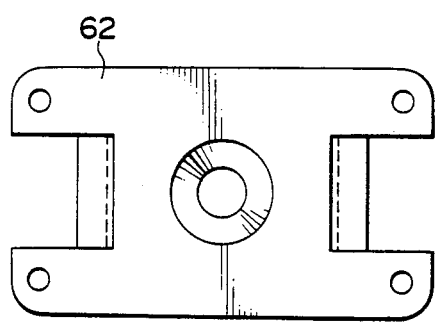

FIGS. 8a and 8b are views showing a modification of the base assembly according to the present invention.

In the above-described embodiment, the bases 1 and 2 are formed as separate members. However, they may be made of a single plastically deformed plate as shown in FIGS. 8a and 8b.

In this example, a base 60 has an opening 61 at the center through which the shaft 7 is received. The base 60 has, at its four corners, mounting portions 62 by which the base 60 is mounted on the control box. The base 60 also has two legs 63 on either sides for supporting the gear base.

The above-described embodiment employs the photosensors 37 to detect the rotational number of the pulse cam 30. However, the detection may also be performed by employing a pulse cam formed of a magnetic material and by employing a magnetic sensor such as a Hall device which detects the holes or notches of the pulse cam 30.

Industrial Applicability

As seen from the above, description the present invention can be applied to an apparatus of the type in which a paddle is moved across the screen by easily turning the operation knob through a small angle and in which such an operation is performed frequently. For example, the present invention can be applied to an operating device for a TV game machine.

We claim:

1. An operating device for a TV game machine for inputting coordinate positions of a controlled object that move across a screen of said TV game machine, comprising:
 a base assembly mounted on a control box of a game machine body;
 a main shaft rotatably mounted on said base assembly;
 an operating knob mounted on an end of said main shaft for rotating said main shaft;

a rotational number increasing mechanism housed within said base assembly, said rotational number increasing mechanism increasing the rotational number of said main shaft;

a disk fixed to an output shaft of said rotational number increasing mechanism and having a plurality of holes or notches in its periphery; and a sensor section for detecting said holes or said notches of said disk.

2. An operating device for a TV game machine according to claim 1, wherein said sensor section comprises two photosensors or two magnetic sensors for distinguishing between the two rotational directions.

3. An operating device for attachment to a control box mounted on a TV game machine body for inputting coordinate positions of a controlled object that moves across a screen which is disposed horizontally or vertically on said TV game machine body, said operating device comprising:

a base assembly including a base plate mounted on an operating panel provided on an upper surface of said control box, two shaft base plates perpendicularly mounted on said base plate, and an inner base plate and a gear base plate connecting said two shaft base plates and defining a space for housing a gear train;

a main shaft rotatably mounted on said base plate and said inner base plate of said base assembly by means of bushings;

an operating knob mounted on an end of said main shaft for direct gripping by the fingers of an operator for rotation;

a rotational number increasing gear train housed between said inner base plate and said gear base plate in said base assembly and which increases the rotational number of said main shaft thereby causing said controlled object to move across said screen when said knob is rotated through a given angle which does not require changing a grip position on said knob;

a disk fixed to said output shaft and having a plurality of peripheral holes or notches; and two sensor sections disposed at positions for detecting optically or magnetically said holes or notches of said disk so as to perform noncontact detection, so that a rotational number and a rotational direction of said disk are detected.

4. An operating device for a TV game machine for inputting coordinate positions of a controlled object that move across a screen of said TV game machine, comprising:

a base assembly;

an input shaft rotatably mounted on said base assembly, said input shaft extending into said base assembly;

an operating knob mounted on an end of said input shaft for the rotation thereof;

a rotatable output shaft mounted on said base assembly, said output shaft extending from said base assembly;

gear means housed within said base assembly for transferring rotational motion from said input shaft to said output shaft, the angular velocity of said output shaft being substantially greater than the angular velocity of said input shaft;

a disk fixed to said output shaft having a plurality of peripheral apertures; and a sensor section for detecting said apertures as said disk rotates, said sensor section being coupled to said screen whereby said object is moved across said screen in response to signals from said sensor section.

5. The operating device for a TV game machine according to claim 4, wherein said gear means comprises a gear mounted on said input shaft;

an intermediate shaft mounted on said base assembly;

a first intermediate shaft gear mounted on said intermediate shaft which meshes with said input shaft gear;

a second intermediate shaft gear mounted on said intermediate shaft; and a gear mounted on said output shaft which meshes with said second intermediate shaft gear.

6. The operating device for a TV game machine according to claim 5, wherein the diameter of said input shaft gear is larger than the diameter of said first intermediate shaft gear and the diameter of said second intermediate shaft gear is larger than the diameter of said output shaft gear.

7. The operating device for a TV game machine according to claim 6, wherein the gear ratio between said input shaft gear and said first intermediate shaft gear is 72:16 and the gear ratio between said second intermediate shaft gear and said output shaft gear is 72:16.

8. The operating device for a TV game machine according to claim 4, wherein said output shaft has an angular velocity about twenty times as great as the angular velocity of said input shaft.

9. The operating device for a TV game machine according to claim 4, wherein said object moves across the entire width of said screen upon rotating said control knob no more than about 150°.

10. The operating device for a TV game machine according to claim 4, wherein said sensor section comprises a photosensor including a light-emitting diode and a photo transistor.

11. The operating device for a TV game machine according to claim 4 further comprising a control circuit for receiving said signals from said sensor section and outputting picture signals based on said sensor signals to said screen, said control circuit comprising a central processing unit coupled to a random-access memory and a read-only memory.

* * * * *